United States Patent
Chen et al.

(10) Patent No.: US 12,214,849 B2
(45) Date of Patent: Feb. 4, 2025

(54) VESSEL POWER SAFETY CONTROL SYSTEM AND OPERATING METHOD THEREOF

(71) Applicant: SHIP AND OCEAN INDUSTRIES R&D CENTER, New Taipei (TW)

(72) Inventors: Bing-Xian Chen, New Taipei (TW); Han-Chun Kao, New Taipei (TW); Hung-Hsi Lin, New Taipei (TW); Yu-Wei Lin, New Taipei (TW); Chung-Ching Lin, New Taipei (TW); Sheng-Hua Chen, New Taipei (TW); Hsiao-Yu Hsu, New Taipei (TW); Wei-Chun Cheng, New Taipei (TW)

(73) Assignee: SHIP AND OCEAN INDUSTRIES R&D CENTER, New Taipei (TW)

( * ) Notice: Subject to any disclaimer, the term of this patent is extended or adjusted under 35 U.S.C. 154(b) by 748 days.

(21) Appl. No.: 17/406,005

(22) Filed: Aug. 18, 2021

(65) Prior Publication Data

US 2022/0169347 A1     Jun. 2, 2022

(30) Foreign Application Priority Data

Dec. 2, 2020   (TW) ................. 109142361

(51) Int. Cl.
*B63B 79/30* (2020.01)
*B63B 79/40* (2020.01)
(Continued)

(52) U.S. Cl.
CPC .............. *B63B 79/30* (2020.01); *B63B 79/40* (2020.01); *H02H 1/0007* (2013.01); *H02H 1/0092* (2013.01); *H02H 7/22* (2013.01)

(58) Field of Classification Search
CPC ....................... B63B 79/00–30; H02H 7/00–30
See application file for complete search history.

(56) References Cited

U.S. PATENT DOCUMENTS

| | | | |
|---|---|---|---|
| 2006/0007610 A1 | 1/2006 | Chan et al. | |
| 2016/0178691 A1 | 6/2016 | Simonin | |
| 2022/0328943 A1* | 10/2022 | Mueller | .............. H01M 50/636 |

FOREIGN PATENT DOCUMENTS

| | | |
|---|---|---|
| CN | 107065723 A | 8/2017 |
| CN | 108803560 A | 11/2018 |

(Continued)

OTHER PUBLICATIONS

Translation of CN 111478307. (Year: 2020).*

*Primary Examiner* — Jared Fureman
*Assistant Examiner* — Christopher J Clark
(74) *Attorney, Agent, or Firm* — Cheng-Ju Chiang

(57) ABSTRACT

The present invention discloses a vessel power safety control system and operating method thereof. The vessel power safety control system includes a load power management module, a real-time monitoring module, an integration module and a power module. The present invention can assist the autonomous ship as any occurrence of fault during navigation. Once the accident occurs, the load power management module will give an instruction to control the DC bus to switch from closed circuit to open circuit to protect other equipment. After determining whether the errors of the equipment on board is eliminated, the load power management system performs automatic system reset procedure. As such, the DC bus can be converted from an open circuit to a closed circuit to restart the power supply for the facility.

18 Claims, 4 Drawing Sheets

(51) Int. Cl.
*H02H 1/00* (2006.01)
*H02H 7/22* (2006.01)

(56) References Cited

FOREIGN PATENT DOCUMENTS

| | | |
|---|---|---|
| CN | 110504672 A | 11/2019 |
| CN | 111478307 A | 7/2020 |
| CN | 111934284 A | 11/2020 |
| JP | 2018-509327 A | 4/2018 |
| JP | 2018-103978 A | 7/2018 |
| KR | 10-2015-0143902 A | 12/2015 |
| KR | 10-2016-0032517 A | 3/2016 |
| KR | 10-2018-0118044 A | 10/2018 |
| KR | 10-2020-0049351 A | 5/2020 |
| KR | 10-2020-0055969 A | 5/2020 |
| KR | 10-2115787 B1 | 6/2020 |
| WO | 2019/103175 A1 | 5/2019 |

\* cited by examiner

VESSEL POWER SAFETY CONTROL SYSTEM AND OPERATING METHOD THEREOF

TECHNICAL FIELD

The present invention relates to a kind of vessel power safety control system and operating method, in particular for electrically powered ship, hybrid power ship and autonomous ship. With the load power management system, the system disclosed herewith monitor the operation status of the ship equipment in real time. Once a fault occurs on said ship equipment, the load power management system opens the circuit thus to protect the other equipment in normal mode, which gives a large advantage over the traditional way that the crew has to deal with and reset in a manual manner.

BACKGROUND OF RELATED ARTS

With the development of technology that keeps pace with the times, the diversified operation of ship transportation will be able to reduce personnel costs and improve operational efficiency if the number of crew members can be reduced. Additionally, with the increasing application of unmanned ships gradually, more attention is paid to the reliability, safety and stability of unmanned ships.

In the past, when unmanned ships experienced equipment failures or abnormalities during navigation, the faults could not be easily isolated and the power system could not be easily reset by the crew in comparison to a ship having pilots. If a power failure occurs and the unmanned ship fails to supply power during the navigation, it will cause the problem of recycling the unmanned ship. Therefore, as the probability of abnormal power condition on the unmanned ship is reduced, the operating efficiency can be improved. Therefore, how to increase the efficiency of using power sources during navigation and reduce the error rate remains major issues.

Traditional power systems on unmanned ships mostly use relays to control power switches. However, the efficiency of the traditional relays is still insufficient. How to minimize the risk of damage caused by abnormal equipment affecting other normal equipment is a problem to be solved at present.

SUMMARY

In light of the problems in the prior art, the present invention provides a vessel power safety control system mainly comprises load power management system, real-time monitoring module and integration module.

The load power management system further comprises a fault protection module and a reset module. Further, the load power management system further comprises at least one busbar, at least one open circuit unit connected with the at least one busbar and the fault protection module, at least one power conversion unit connected with the reset module and the at least one open circuit unit, at least one power module connected with the at least one open circuit unit, at least one energy supply unit connected with the at least one open circuit unit; and at least one battery connected with the energy supply unit.

On the other hand, the present invention further provides a method of operating the vessel power safety control system, following the steps: (A) Provide a vessel power safety control system as mentioned in the preceding paragraphs. (B) When the vessel power safety control system is started, a load power management system transmits a starting signal to a real-time monitoring module for monitoring simulation. (C) The monitoring simulation is transmitted in real time to a system status detecting module of an integration module in order to perform a system status detection. (D) If the system status detection produces a normal mode, allowing the procedure of step (B) to step (D) to continue. Otherwise, if the system status detection produces a fault mode, allowing step (E) to continue. (E) Start a fault protection module of the load power management system and thus give a first interruption instruction. The fault protection module executes the first interruption instruction on at least one failure equipment determined by the real-time monitoring module during an interruption time and simultaneously perform a damage inspection. (F) According to the damage inspection, start a reset module of the load power management system and perform a fault isolation. (G) The system status detecting module performs the system status detection, if the system status detection presents the normal mode, allowing step (H) to continue; otherwise, if the system status detection presents the fault mode, allowing the procedures of step (E) to step (G) to continue repeatedly until the system status detection presents the normal mode. (H) The reset module performs an automatic reset during a reset time and reverse back to step (B).

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical efficacy of the present invention and to implement it in accordance with the contents of the specification, hereinafter, preferred embodiments of the present invention will be described in detail with reference to the accompanying drawings.

Figure 1:
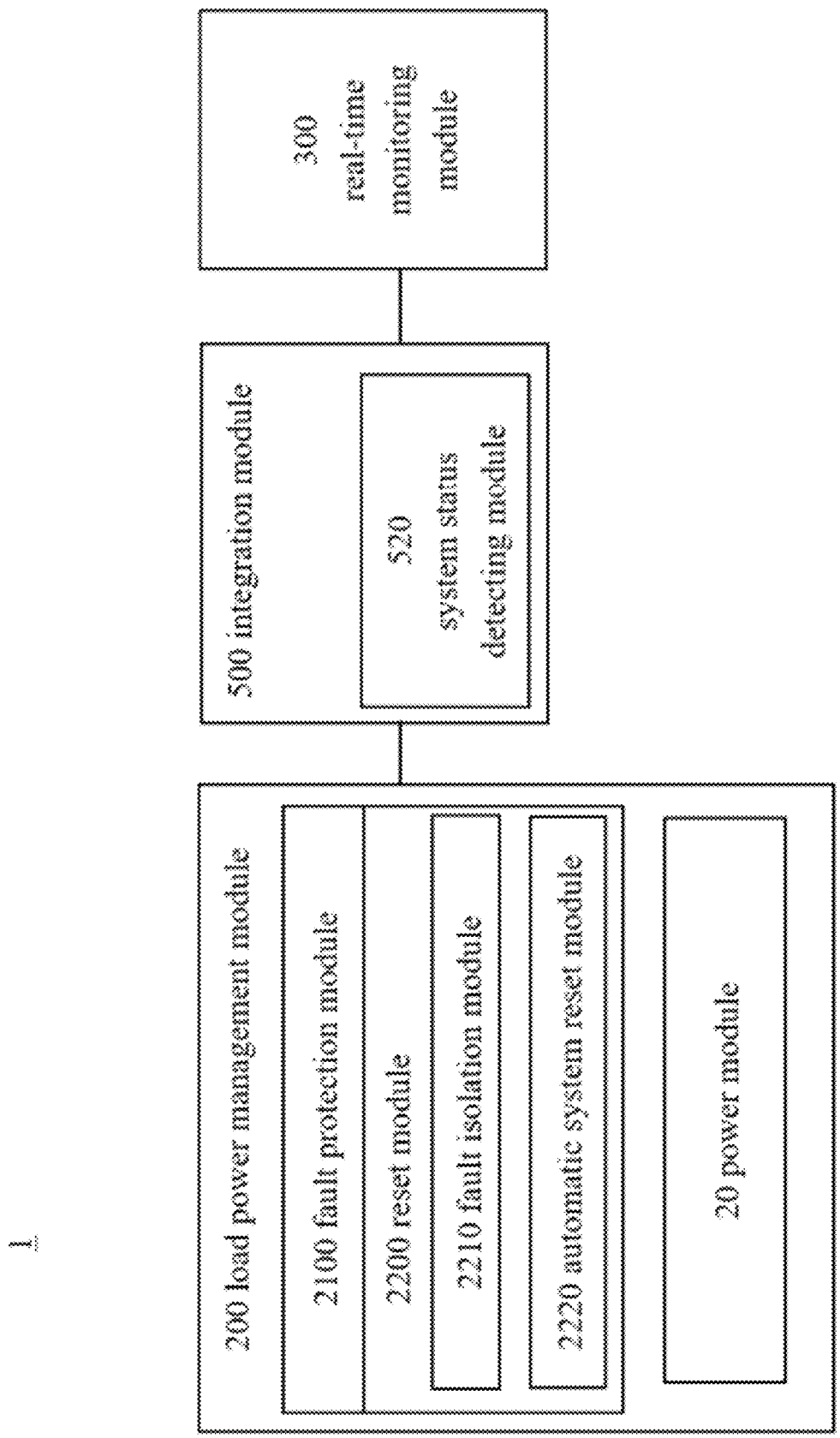
FIG. 1 illustrates a schematic diagram of the vessel power safety control system of an embodiment of the present invention.
Figure 3:
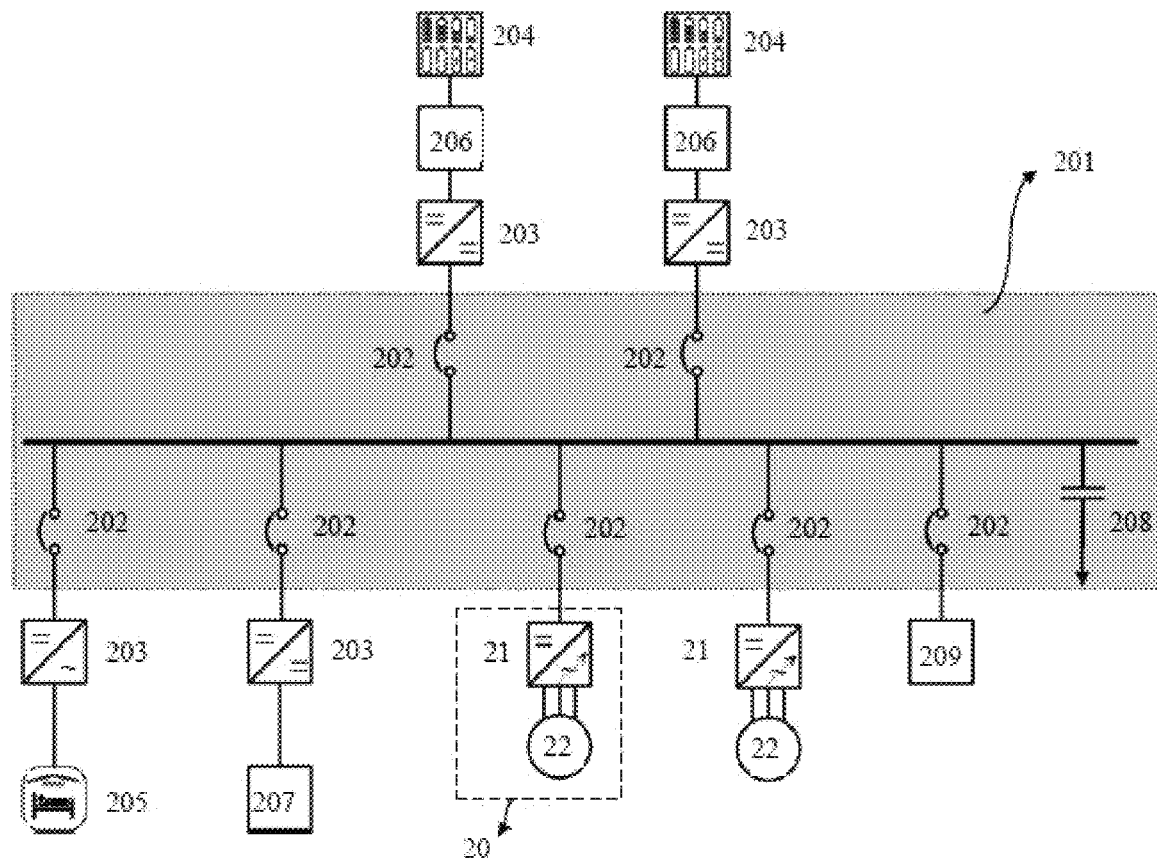
FIG. 3 illustrates an electric power framework of the vessel power safety control system of an embodiment of the present invention.

Please refer to FIG. 1 and FIG. 3. FIG. 1 is a schematic diagram of the vessel power safety control system of an embodiment of the present invention. FIG. 3 is an electric power framework of the vessel power safety control system of an embodiment of the present invention. As shown in FIG. 1, the present embodiment of the vessel power safety control system mainly comprises three parts of modules: a load power management system 200, a real-time monitoring module 300 and an integration module 500.

First, please refer to FIG. 1. The load power management module 200 of the present invention is connected to the integrated computing module 500. In this embodiment, please further refer to FIG. 3, the implementation of the load power management module 200 requires at least one busbar 201, at least one open circuit unit 202, at least one power conversion unit 203, at least one power module 20, at least one energy supply unit 206 and at least one battery 204. The busbar 201 can be a DC link or an AC link, which is not limited by the present invention. Furthermore, the at least one open circuit unit 202 is respectively connected to the busbar 201 and connected to the fault protection module 2100 (not shown in present drawings). As for the at least one power conversion unit 203 to be selectively connected to the at least one open circuit unit 202, it depends on whether the terminal device needs AC-DC power conversion requirements, transforming or driving functions. And the at least one power conversion unit 203 is further connected to the reset module 2200 in FIG. 1 (not shown).

In this embodiment, the at least one power conversion unit 203 may be a converter, a rectifier or an inverter. The at least one power module 20 is also connected to the open circuit unit 202. The power module 20 further includes a driving unit 21 and a motor unit 22. The driving unit 21 is connected to the open circuit unit 202, and the motor unit 22 is connected to the driving unit 21. The driving unit 21 may be a propulsion driver, or any device that drives the operation of the ship, and the present invention is not limited. The at least one energy supply unit 206 is connected to the open circuit unit 202. The energy supply unit 206 can be a generator, a renewable energy generator, or any device that can generate energy. The at least one battery 204 is connected to the energy supply unit 206. In this embodiment, the at least one battery can be a single lithium battery or lithium batteries in parallel, and the present invention is not limited thereto. In order to prevent system failures or abnormalities, the load power management module is configured with at least one backup power supply (not shown).

Please continue to refer to FIG. 3, the load power management module 200 is configured with a hotel load 205. Additionally, the hotel load 205 is connected to the busbar 201 through one of the open circuit units 202. On the other hand, the load power management module 200 is further provided with at least one low to medium voltage load 207, which is connected to the busbar 201 through one of the open circuit units 202. In some embodiments, the load power management module 200 is further provided with at least one leakage protector 209, so that a leakage protection detection is performed on the low to medium voltage load 207 during the reset procedure. A capacitor 208 can be further provided on the busbar 201 for buffering the pre-charging process on the high-voltage load (the detailed embodiments will be described as follow).

Figure 4:
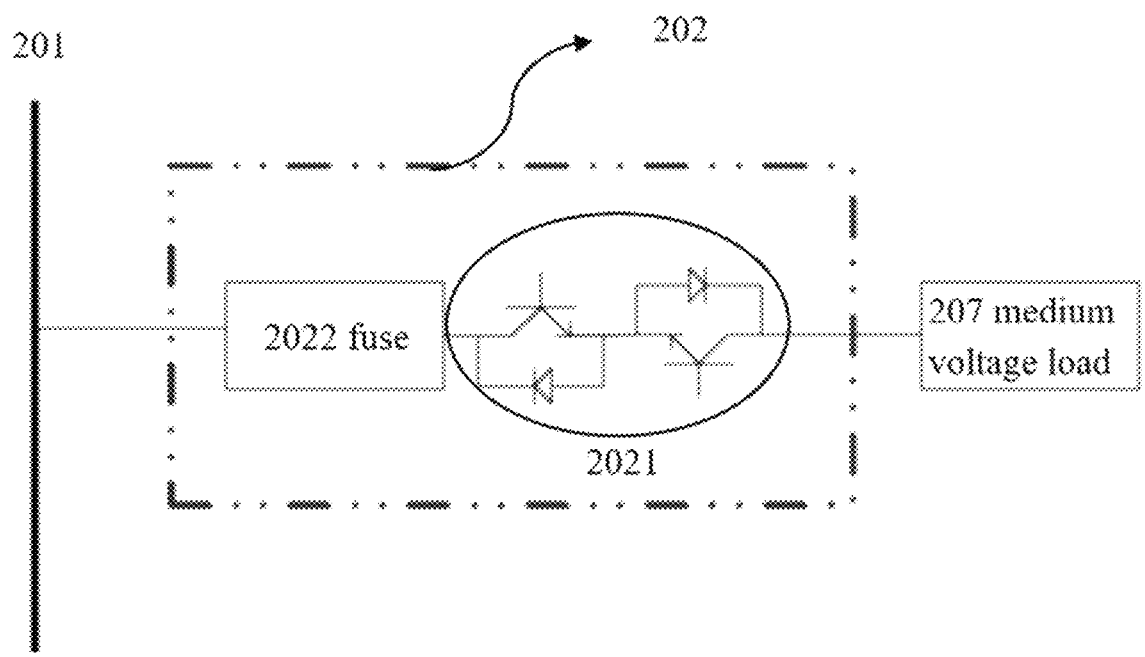
FIG. 4 shows a framework of the open circuit unit of the vessel power safety control system of the embodiment of the present invention.

Please refer to FIG. 4, the at least one open circuit unit 202 is connected to the busbar 201 and the other end is connected to various loads (As shown in FIG. 4 is one of the embodiments, which is connected to the low to medium voltage loads 207). In this embodiment, the open circuit unit 202 further includes a fuse 2022, a circuit breaker 2021, or a combination thereof. Specifically, the achievable breaking time of the open circuit unit 202 ranges from 250 microseconds (μs) to 170 milliseconds (ms). In the present embodiment, the circuit breaker 2021 can be configured as a unidirectional insulated gate bipolar transistor (IGBT) or a bidirectional insulated gate bipolar transistor (IGBT) as the case may be, and the present invention is not limited.

Please continue to refer to FIG. 1, in the vessel power safety control system 1 of this embodiment, the load power management module 200 further includes a fault protection module 2100 and a reset module 2200, which mainly control the power system. When the integration module 500 determines that the vessel power safety control system 1 is in a fault mode, the fault protection module 2100 is activated to perform the first interruption instruction, that is, to isolate the failure equipment from the busbar 201 in advance. The fault protection module 2100 immediately isolates the other devices upon isolating the failure equipment to temporarily power off and perform a damage inspection at the same time.

Furthermore, the reset module 2200 further includes a fault isolation module 2210 and an automatic system reset module 2220. After the aforementioned damage inspection, the fault isolation module 2210 performs a fault isolation based on the damage inspection result. The said fault isolation mainly troubleshoots occurrences of faults. If the troubleshooting fails, the occurrences of faults are electrically isolated from a busbar to ensure that the following automatic system reset procedure executed under normal conditions. Specifically, the fault isolation is to restart the vessel power safety control system 1, which ends in slowly returning to the original operating voltage. Then, after confirming that the vessel power safety control system 1 recovers to a normal state, the automatic system reset module 2220 executes the automatic system reset procedure.

When executing the automatic system reset procedure of the vessel power safety control system 1, there are special reset procedures for the high-voltage power supply and the low to medium-voltage power supply, which are respectively provided by the high voltage reset unit and the low to medium voltage reset unit configured in the automatic system reset module 2220. The detailed description of the special reset procedures is presented later. The high-voltage reset unit is used for resetting a high-voltage system with a DC voltage of 330V, such as a power propulsion system; the low to medium voltage reset unit is used for resetting a medium voltage system and a low voltage system. Specifically, the medium voltage system includes the use of DC voltage 24V to AC voltage 110V, such as AC inverter; the low voltage system includes the use of DC voltage 330V to DC voltage 24V, such as bow thruster converter, hotel load converter. Additionally, the low to medium voltage reset unit must be used with at least one leakage protector in the load power management module 200 to complete the reset procedure of the low to medium voltage power supply. Moreover, the reset procedures of the high-voltage power supply and the medium-low-voltage power supply must be completed before the power is reconnected to the busbar. If one of the procedures is not completed, the procedure of fault diagnosis and isolation must be performed again.

In the vessel power safety control system 1 of this embodiment, referring to FIG. 1, a real-time monitoring module 300 is further provided and connected to the integration module 500. When the vessel power safety control system 1 in this embodiment is activated, the load power management system transmits a starting signal to the real-time monitoring module 300, and the real-time monitoring module 300 then performs system simulation to monitor the status information of each device in real time, such as the operating status of the power module 20 itself or other equipment. The system status detecting module 520 configured in the integration module 500 determines and generates a normal mode, an internal fault mode or an external fault mode.

When a fault occurs in the vessel power safety control system 1, which is determined as an internal fault mode or an external fault mode, prompting the load power management system to give a power-off instruction, and at the same time stopping the real-time monitoring module 300 executing the monitoring simulation. Once the abnormalities and faults are eliminated, the load power management module 200 immediately executes the automatic system reset procedure, restarts the vessel power safety control system 1 and prompts the real-time monitoring module 300 to perform monitoring simulation to restore the normal operation of the system.

Figure 2:
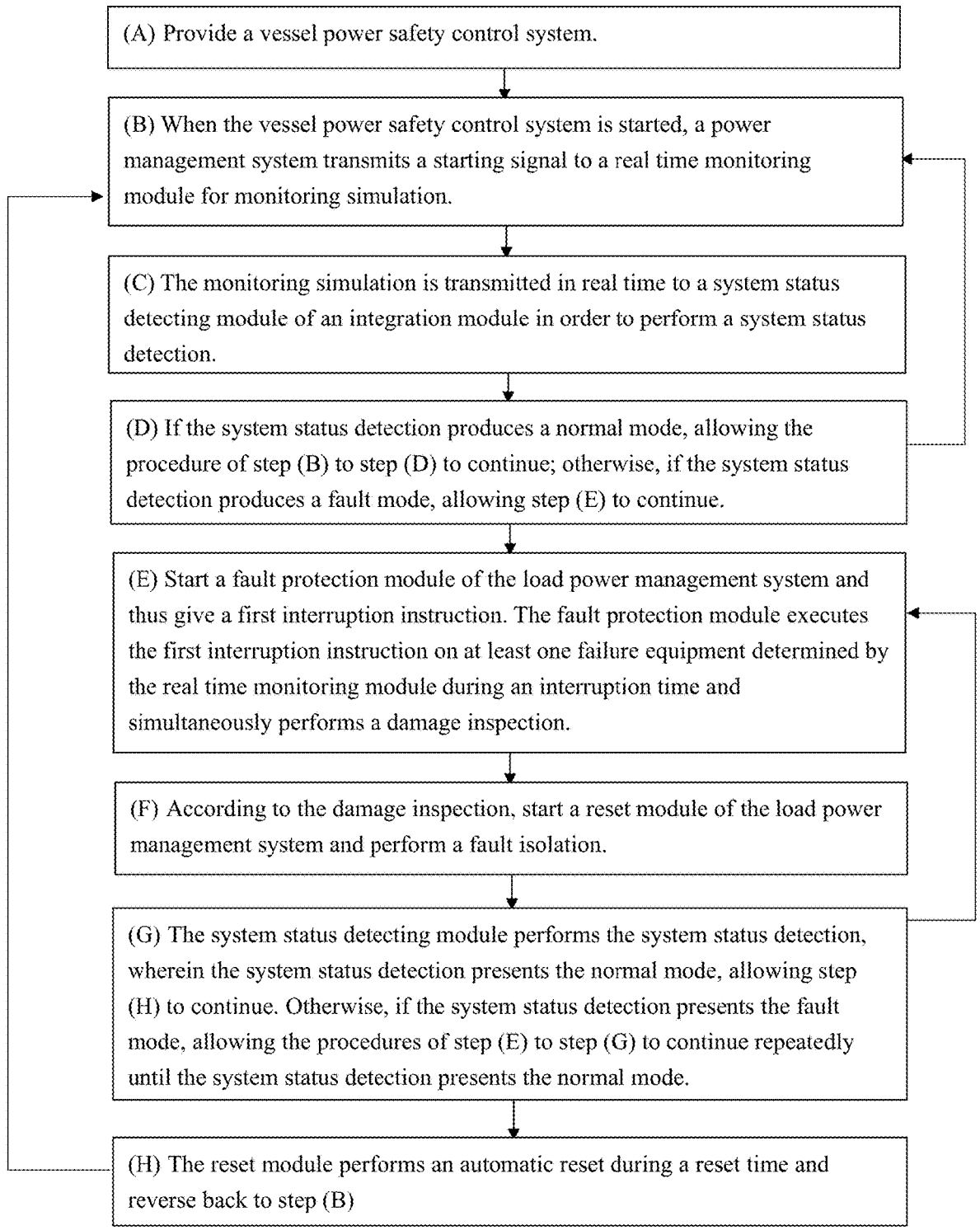
FIG. 2 illustrates a flow chart of the method of operating the vessel power safety control system of the embodiment of the present invention.

Please refer to FIG. 2, which is a flowchart of the operation method of the vessel power safety control system 1 according to a preferred embodiment of the present invention. As shown in FIG. 2, the operation method of the vessel power safety control system 1 includes the following steps: (A) Provide a vessel power safety control system 1 as previously mentioned. (B) When the vessel power safety control system 1 is started, a load power management system 200 transmits a starting signal to a real-time monitoring module 300 for monitoring simulation. (C) The monitoring simulation is transmitted in real time to a system status detecting module 520 of an integration module 500 in order to perform a system status detection. (D) If the system status detection produces a normal mode, allowing the procedure of step (B) to step (D) to continue. Otherwise, if the system status detection produces a fault mode, allowing step (E) to continue; (E) Start a fault protection module 2100 of the load power management system 200 and thus give a first interruption instruction. The fault protection module 2100 executes the first interruption instruction on at least one failure equipment determined by the real-time monitoring module 300 during an interruption time and simultaneously performs a damage inspection. (F) According to the damage inspection, start a reset module 2200 of the load power management system 200 and perform a fault isolation. (G) The system status detecting module 520 performs the system status detection. If the system status detection presents the normal mode, allowing step (H) to continue. Otherwise, if the system status detection presents the fault mode, allowing the procedures of step (E) to step (G) to continue repeatedly until the system status detection presents the normal mode. (H) The reset module 2200 performs an automatic reset during a reset time and reverse back to step (B).

Further, during the operation of the vessel power safety control system 1, the load power management system is mainly used to start, run, and stop the power system. First, in step (A), a vessel power safety control system 1 integrated with the aforementioned load power management module 200 and the real-time monitoring module 300 is provided. Before the system is started, a backup power supply is used to supply power to make the vessel power safety control system 1 is in the standby state. Then, when the system is started in step (B) in this embodiment, the lithium-iron-phosphate battery (LiFePO$_4$ battery) is chosen as the electric energy to be introduced into the DC link (DC-BUS) to provide electric energy to various devices on the DC link, such as left and right motors, direct-current stabilizer steps down and supplies power to hotel loads, left and right bow thrusters, etc.

Simultaneously, the load power management module 200 transmits a start signal to the real-time monitoring module 300. After receiving the instruction, the real-time monitoring module 300 starts to monitor and simulate each device in the system. The user can recognize the operating status of each equipment through the monitoring simulation results. On one hand, the monitoring simulation results present the operating status of device or equipment (e.g., the real-time status of the left and right propulsion systems, the hotel load converters on the left and right sides, and the bow thruster converters on the left and right sides) by means of setting 6 digital signals which represents occurrence of faults in order to carry out fault monitoring. Specifically, the operating status of device or equipment is determined with the combination of digital pins 1/0 (i.e., when the system is in normal mode, each digital pin of the system is 1; otherwise, if it is 0, the equipment is in fault mode), or with the related data such as the speed of the left and right motors and the output voltages of each DC regulator. On the other hand, the left and right motors in the running state can also charge the backup power supply.

In step (C) of this embodiment, the monitoring simulation result of step (B) is transmitted to the integration module 500 in real time, combined with the power usage status transmitted from the load power management module 200, such that the system status detecting module 520 performs system status detection and can determine which equipment is in fault according to the corresponding pin electric potential. When the equipment is in normal operation, the system status detecting module 520 will perform fault judgment and confirm whether it is for noise signals upon any equipment abnormal analog signal is triggered. In other words, once the digital pin of the said equipment changes from 1 to 0, it means that the equipment is abnormal.

Further, in step (D), the system status detection results are defined and analyzed, and the system status detecting module 520 accordingly presents that the vessel power safety control system 1 is in the normal mode, in the internal fault mode, in the external fault mode or combinations thereof. If the status is determined to be the normal mode, return to step (B) to continue the monitoring simulation during normal operation, follow with the real-time system status detection of step (C), to update the real-time status of the vessel power safety control system 1 at any time until the system status detecting module 520 presents a fault mode before proceeding to step (E).

To be more specific, the fault mode can be further categorized into an internal fault mode and an external fault mode. The internal fault mode encompasses 6 types of fault triggering scenarios constructed by the integration module 500, including the faults in the left-hand propulsion system, the right-hand propulsion system, in the power supply of the hotel load converter on the left, in the power supply of the hotel load converter on the right, in the power supply of the left bow thruster converter, and in the power supply of the right bow thruster converter. The external fault mode includes abnormalities caused by unpredictable external factors, such as short-circuits, being struck by missiles, and other unexpected disasters.

Corresponding to step (D), if an occurrence of a fault is located by the real-time monitoring module 300 and the system status detecting module 520 further defines the fault mode as the external fault mode, the load power management system gives a second interruption instruction, followed by step (E).

Further, the second interruption instruction demonstrates to activate an open circuit unit 202 of the occurrence of a fault to isolate the occurrence of a fault from a busbar 201, or any method for isolating the occurrence of a fault from the busbar is included within the range of the present invention. Specifically, the second interruption instruction may be provided that the fuse near the occurrence of a fault is blown, ending in the occurrence of a fault is isolated from the direct current, and the fuse blown time ranges from 90 microseconds (μs) to 250 microseconds (μs). The purpose of the second interruption is to exclude abnormal equipment that cannot be restored within the scope of the implementation equipment of the automatic system reset procedure, so as to facilitate the subsequent system debugging and fault isolation.

Please proceed further to step (E) in FIG. 2. When the system status detection is determined to be a fault mode, the fault protection module 2100 in the load power management module 200 is activated to issue the first interruption instruction, and the first interruption instruction is to isolate at least one failure equipment determined by the real-time monitoring module 300 from the busbar during an interruption time.

Specifically, the open circuit unit of the at least one failure equipment is activated to disconnect the failure equipment from the DC link, and then the remaining equipment also perform the first interruption instruction, that is, the remaining equipment are temporarily powered off to facilitate simultaneous damage inspection. Precisely, the abovementioned interruption time is between 250 microseconds (μs) to 170 milliseconds (ms) in this embodiment. In step (F), after the damage inspection is performed on the intact equipment other than the aforementioned failure equipment, the reset module 2200 in the load power management module 200 is activated to perform fault isolation according to the damage inspection result.

The fault isolation comprises performing a fault dropping, activating the open circuit unit of the occurrence of a fault or combinations thereof. Specifically, when the fault fails to be troubleshooted, then the occurrence of a fault is isolated, that is, to be separated from the DC link.

After the fault isolation in step (F), please refer to the following step (G) of the present embodiment in FIG. 2. The system status detecting module 520 must perform system status detection again to confirm that whether the system is in a normal mode, that is, when the normal operation state can be restored, the automatic system reset procedure of step (H) will be continued. Otherwise, if the system status detection turns out to be a fault mode, you must return to step (E) to perform the first interruption instruction and the damage inspection of the fault protection and the fault isolation of step (F), that is, repeat the serial procedures of step (E) to step (G) until the normal mode is determined during the system status detection, so that step (H) can be carried out to ensure that all equipment can operate normally before the automatic system reset procedure of the vessel power safety control system 1.

Finally, in step (H), when the vessel power safety control system 1 is in the normal mode, the automatic system reset module 2220 in the load power management module 200 performs the automatic system reset procedure within a reset time. Specifically, the reset time is between 3 second to 27 second. After completing the automatic system reset procedure of the system, return to step (B) to restart the vessel power safety control system 1.

It is specified that the "automatic system reset procedure" is defined as after the complete isolation of occurrences of fault or failure equipment and the simultaneous damage inspection during the aforementioned short-term power failure/service interruption to assure the safety, inducing the rest of the equipment that can operate normally to restart. The automatic system reset procedure of the system further includes the reset procedure of the high voltage power supply and the reset procedure of the low to medium voltage power supply, and these two reset procedures must be completed before the electric power is connected to the DC link to restart the system. Otherwise, it is required to go back to the sequential procedures of step (C) to step (F) to redo the system status detection and the follow-up fault dropping/troubleshooting, damage inspection, and fault isolation.

In other words, in this embodiment, necessary measures are taken for different range of voltage requirements. It is noteworthy that the reset procedure in step (H) of the vessel power safety control system 1 in this embodiment further includes a high voltage reset progress, which is implemented by the following steps: (I) a high-voltage power supply executes a pre-charging procedure. (J) Perform charging of an electrically machine load capacitor on a high-impedance pre-charging circuit. (K) When the voltage difference between the voltage of the electrically machine load capacitor and the voltage of a main power supply is small, complete the pre-charging procedure. (L) Reconnect the high-voltage power supply to a busbar to supply power.

For example, when the high-voltage power supply needs to be reconnected to the DC link, the pre-charging procedure must be performed first, so that the high-impedance pre-charging circuit is first charged with the front-end electrically machine load capacitor 208 on the DC link. The main purpose of the high voltage reset progress is to solve the problem that when the main circuit of the electric power is re-inserted into the DC link, a large current generated by a short-circuit of the capacitor 208 will cause system damage. When the difference between the voltage of the load capacitor 208 and the main power supply voltage is small, the power supply is reconnected to the DC link to supply power. While in the low to medium voltage reset procedure, the low to medium-voltage power supply requires the leakage protector to confirm whether there are leakage current problems in the DC link. If there is no problem existing, put the low to medium-voltage power supply into the bus bar to supply the output.

The effect of the embodiment of the present invention lies in the equipment with automatic power off function, including a switchgear with a microsecond level. In the preferred embodiment of the present invention, there is the configuration of an insulated gate bipolar transistor (IGBT) and the range of invention is not limited to this. The advantages of the configuration of an insulated gate bipolar transistor (IGBT) are high efficiency and fast switching speed. Additionally, the vessel power safety control system 1 includes an integration module 500, which effectively combines the real-time monitoring module 300 and the load power management module 200 to monitor the status of various equipment in the system in real time and are able to respond to various occurrences of fault or failure equipment at any time. In response to the aforementioned accidents occurring, fault isolation is necessary to reduce damage to other equipment. With the automatic system reset procedure of the present invention, after an automatic short-term power off for fault isolation and damage inspection, an appropriate reset procedure can be effectively performed in response to the difference in equipment parameters concerning to the safety of the system.

The ordinal numbers used in the detailed description and claims, such as "first" and "second" do not necessarily indicate their priority orders or up and down directions; on the contrary, they are merely intended to distinguish different elements. It will be apparent to those skilled in the art that various modifications and variations can be made to the structure of the present invention without departing from the scope or spirit of the invention. In view of the foregoing, it is intended that the present invention covers modifications and variations of this invention, provided they fall within the scope of the following claims.

What is claimed is:

1. A vessel power safety control system, comprising:
   an integration module;

a real-time monitoring module, connected with the integration module; and a load power management system, connected with the integration module;

wherein the load power management system comprises a fault protection module and a reset module;

wherein the load power management system further comprises:

at least one busbar;

at least one open circuit unit, connected with the at least one busbar and the fault protection module;

at least one power conversion unit, connected with the reset module and the at least one open circuit unit;

at least one power module, connected with the at least one open circuit unit;

at least one energy supply unit, connected with the at least one open circuit unit; and at least one battery, connected with the at least one energy supply unit.

2. The vessel power safety control system as claimed in claim 1, wherein the load power management system further comprises at least one hotel load, at least one standby power, at least one leakage protector, at least one capacitor or combinations thereof.

3. The vessel power safety control system as claimed in claim 2, wherein the open circuit unit further comprises a fuse, a circuit breaker or combinations thereof, of which the interruption time is 250 µs~170 ms.

4. The vessel power safety control system as claimed in claim 3, wherein the circuit breaker is an unidirectional Insulated Gate Bipolar Transistor (IGBT) or a bidirectional Insulated Gate Bipolar Transistor (IGBT).

5. The vessel power safety control system as claimed in claim 1, wherein the reset module further comprises a fault isolation module and an automatic system reset module.

6. The vessel power safety control system as claimed in claim 5, wherein the automatic system reset module comprises a high voltage reset unit and a low to medium voltage reset unit.

7. The vessel power safety control system as claimed in claim 1, wherein the integration module comprises a system status detecting module.

8. The vessel power safety control system as claimed in claim 7, wherein the system status detecting module produces a normal mode, an internal fault mode or an external fault mode.

9. An operating method of a vessel power safety control system, comprising:

(A) providing the vessel power safety control system as claimed in claim 1;

(B) when the vessel power safety control system is started, the load power management system transmitting a starting signal to the real-time monitoring module for monitoring simulation;

(C) the monitoring simulation is transmitted in real time to a system status detecting module of the integration module in order to perform a system status detection;

(D) when the system status detection producing a normal mode, continuing to the procedure of step the (B) to the step (D); otherwise, when the system status detection produces a fault mode, continuing to step (E);

(E) starting a fault protection module of the load power management system and thus giving a first interruption instruction, wherein the fault protection module executes the first interruption instruction on at least one failure equipment determined by the real-time monitoring module during an interruption time and simultaneously perform a damage inspection;

(F) according to the damage inspection, starting the reset module of the load power management system and performing a fault isolation;

(G) the system status detecting module performing the system status detection, wherein the system status detection presents the normal mode, continue to step (H); otherwise, wherein the system status detection presents the fault mode, continue to the procedures of the step (E) to the step (G) repeatedly until the system status detection shifts to the normal mode; and (H) the reset module performing an automatic reset during a reset time and reversing back to the step (B).

10. The operating method of the vessel power safety control system as claimed in claim 9, wherein the system status detecting module produces a normal mode, an internal fault mode, an external fault mode or combinations thereof.

11. The operating method of the vessel power safety control system as claimed in claim 10, wherein in the step (D), where the real-time monitoring module locates occurrence of a fault and the system status detecting module further defines the fault mode as the external fault mode, the load power management system gives a second interruption instruction, followed by the step (E).

12. The operating method of the vessel power safety control system as claimed in claim 11, wherein the second interruption instruction activates an open circuit unit associated with the occurrence of the fault to electrically isolate the occurrence of the fault from the busbar.

13. The operating method of the vessel power safety control system as claimed in claim 12, activate the open circuit unit associated with the occurrence of the fault by means of blowing a fuse coupled to the occurrence of the fault.

14. The operating method of the vessel power safety control system as claimed in claim 9, wherein in step (E), the interruption time is 250 µs~170 ms.

15. The operating method of the vessel power safety control system as claimed in claim 9, wherein in step (E), the first interruption instruction comprises activating the open circuit unit of the at least one failure equipment to electrically isolate the at least one failure equipment from a busbar.

16. The operating method of the vessel power safety control system as claimed in claim 9, wherein in step (F), the fault isolation comprises performing a fault dropping, activating the open circuit unit associated with the occurrence of a fault or combinations thereof.

17. The operating method of the vessel power safety control system as claimed in claim 9, wherein in step (H), the reset time ranges from 3 second to 27 second.

18. The operating method of the vessel power safety control system as claimed in claim 9, wherein in step (H), the automatic reset further comprises a high voltage reset procedure and a low to medium voltage reset procedure.

* * * * *